Patented Aug. 21, 1951

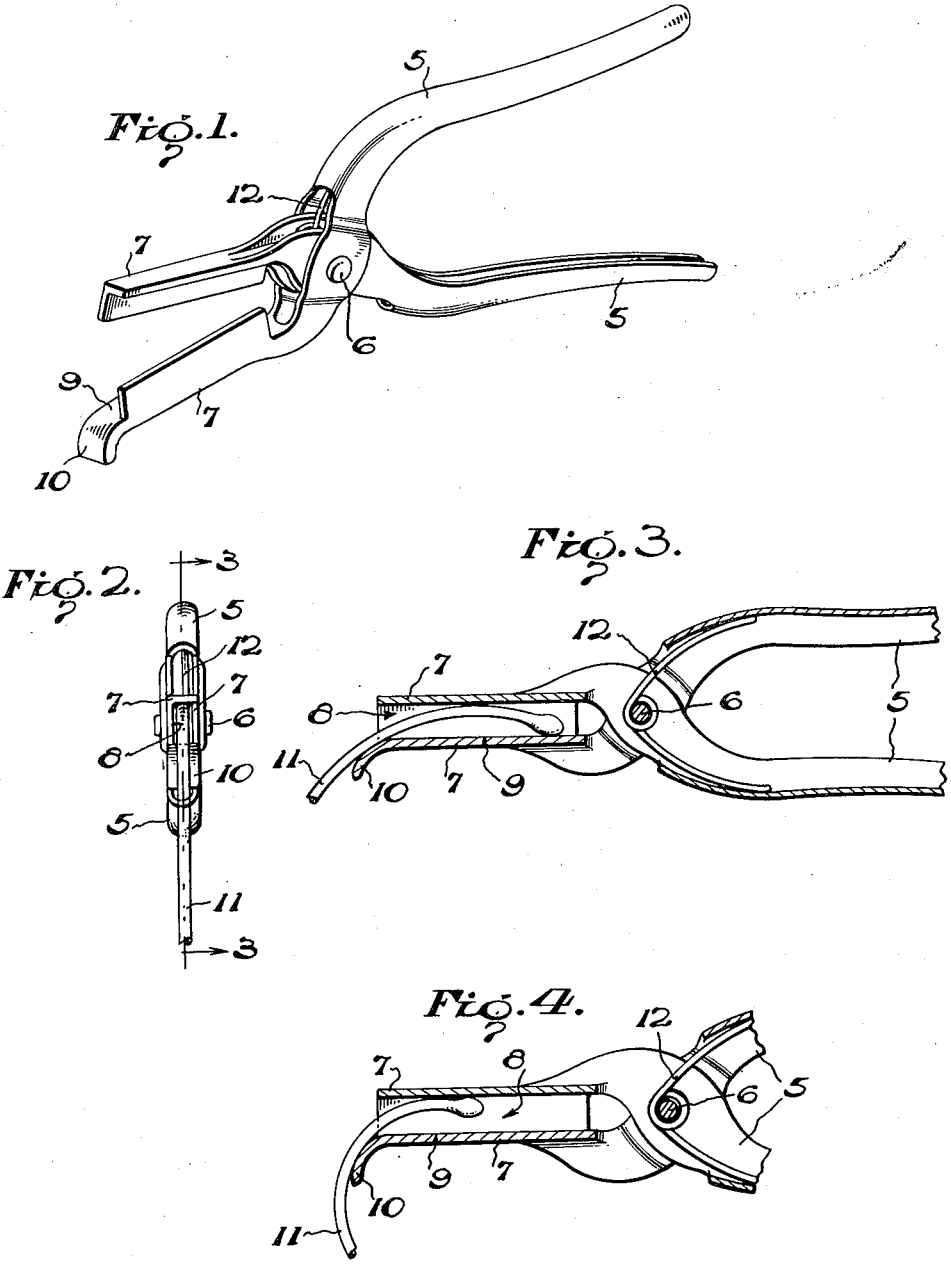

2,564,752

UNITED STATES PATENT OFFICE 2,564,752

OPTICIAN'S PLIERS

John E. Collins, Paterson, N. J.

Application September 30, 1948, Serial No. 52,070

6 Claims. (Cl. 81—3.5)

My invention relates to tools and more particularly to optician's pliers for shaping temple bars and the like.

In the fitting of eyeglasses, each of the temple bars of the frame is shaped to accord with the shape of the head of the wearer in order that the lenses will not only be properly positioned with respect to the eyes but to provide a comfortable fit about the temples and ears. Heretofore, in shaping the temple bars, it has been customary to heat and insert each bar transversely between the jaws of a pair of pliers and to bend the same to conform to the desired shape. Inasmuch as this operation usually necessitates frequent shifting and bending of the bar transversely, the bar, particularly when constructed of plastic material, is usually marred by the gripping action of the jaws of the pliers and assumes a contour having a multiplicity of adjacent sharply defined curved portions. Shaping a temple bar in this manner requires considerable time for the reason that reshaping is often found necessary in order to smooth out the sharply defined curved portions to attenuate the jointures therebetween.

The foregoing described operation, besides being extremely vexatious, often results in breakage or rupture of the bar at one of the jointures between the curved portions because the operational time is such as to permit sufficient cooling of the bar for it to assume its inherent brittleness. Furthermore, the surfaces or zones gripped and marred by the jaws of the pliers offer excellent points of rupture or breakage and materially contribute thereto rather than towards resiliency or resistance to fracture when undue stress is applied to the bar by reason of lack of knowledge with respect to the prevailing temperatures of the bar.

My invention overcomes and eliminates the undesirable features and disadvantages of the foregoing described pliers, it being one of the objects thereof to provide a tool, for instance, a pair of pliers or the like wherein the jaws are designed and arranged in a manner to longitudinally receive a temple bar of an eyeglass frame and manipulatable for imparting a harmonious shape to the length of the bar in conformity with a desired and necessary configuration essential to proper positioning of the frame with respect to vision and comfortable fit relative to use for the wearer.

Another object of my invention is to provide a tool of the foregoing described character which is so constructed and arranged as to preclude any appreciable marring of the temple bar while being shaped by the tool.

An important object of my invention is to provide a tool of the foregoing described character which is simple in construction, durable in use, efficient in operation and economical in manufacture.

With the above and other objects in view, as will hereinafter appear, the invention consists in the combination and arrangement of parts hereinafter set forth and illustrated in the accompanying drawings from which the several features of the invention and the advantages attained thereby will be readily understood by those skilled in the art.

Referring to the drawings wherein like reference characters designate like parts throughout the several views:

Figure 1 is a perspective view of a tool constructed in accordance with my invention and with the jaws thereof being open.

Figure 2 is a front elevation of the tool with the jaws closed and a temple bar inserted between the jaws.

Figure 3 is a sectional view taken on the line 3—3 of Figure 2 and illustrating a step in the shaping of the temple bar.

Figure 4 is a view similar to Figure 3 but illustrating another step in the shaping of the temple bar.

In practicing my invention, as illustrated in the drawing, I provide a tool constructed of metal and in the form of a pair of pliers comprising a pair of handles 5 pivoted together as at 6 and having ends adjacent the pivot 6, terminating in a pair of elongated jaws 7, each of which is of an L-shaped configuration in cross section. When the jaws are in closed position, they define an elongated substantially square-shaped trough 8 having open front and rear ends, the jaws constituting the side, top and bottom walls of the trough.

A wall 9, which is other than a side wall, of one of the jaws is provided at the front end of the trough 8 with a forwardly disposed arcuate end section 10 extending beyond and away from the other walls and which section 10 constitutes a shaping fulcrum or anvil for a temple bar 11 inserted between the jaws. If desired, a spring 12 may be provided and positioned between the handles 5 for normally maintaining the jaws 7 in open position to facilitate quick insertion of the temple bar 11 between the jaws and its removal therefrom.

In use, assuming the jaws 7 are in open position, the temple bar 11 is positioned between the jaws 7 and the latter operated into engagement therewith, whereupon, pressure is applied to the bar to shape the latter over the anvil 10 as clearly illustrated in the drawing, it being understood that the bar is heated to a temperature to effect a desired pliability therein. Obviously, by repositioning the temple bar between the jaws and shaping the bar over the anvil, a desired and harmonious shape may be imparted to the bar without marring the surface thereof.

From the foregoing, it will be apparent that I have provided a simple and efficient tool whereby temple bars and the like may be shaped to conform to a desired pattern without marring and over a period of time wherein the heat of the bar is maintained within a range sufficient to preclude rupture and breakage thereby resulting in a savings with respect to labor and loss of bars by breakage and damage.

Without further elaboration, the foregoing will so fully explain the invention that others may, by applying current knowledge, readily adapt the same for use under various conditions of service. Moreover, it is not indispensable that all the features of the invention be used conjointly since they may be employed advantageously in various combinations and subcombinations.

It is obvious that the invention is not confined to the herein described use therefore as it may be utilized for any purpose to which it is adaptable. It is therefore to be understood that the invention is not limited to the specific construction as illustrated and described, as the same is only illustrative of the principles involved which are capable of extended application in various forms, and the invention comprehends all construction within the scope of the appended claims.

What I claim is:

1. In a tool of the class described, a pair of elongated pivoted jaws manipulatable to open and closed positions with each of said jaws being of an L-shaped configuration in cross-section and cooperating with the other jaw, when in closed position, to define an open end trough, one of said jaws being provided with an arcuate end section for engaging a temple bar inserted in said trough for shaping said bar when the latter is retained in said trough and worked over said section.

2. In a tool of the class described, comprising a pair of pivoted handles having coincident ends terminating in elongated jaws respectively; said jaws being manipulatable to open and closed positions by said handles and with each of said jaws being provided with a lateral wall; said walls and jaws coacting when the latter are in closed position, to define a trough; one of said jaws being provided with an arcuate end section for engaging a temple bar inserted in said trough for shaping said bar when the latter is retained in said trough and worked over said section.

3. In a plier construction, a pair of pivoted handles equipped with jaws manipulatable by said handles to open and closed positions with each of said jaws being provided with a pair of right-angular related walls cooperating with the walls of the other jaw, when in closed position, to define an open end trough, one of said walls being provided with an arcuate end section for engaging a temple bar inserted in said trough for shaping said bar when the latter is retained in said trough and worked over said section.

4. In a plier construction, a pair of pivoted handles equipped with jaws movable by said handles to open and closed positions, said jaws being of a cross-sectional shape when in closed position to define an open end trough extending lengthwise with respect to said jaws and with said trough adapted to receive a temple bar, a shaping fulcrum provided at one end of said trough, walls of said trough coacting together and with said fulcrum to effect shaping of said bar when disposed in said trough and manipulated with respect to said jaws.

5. In a tool of the class described, a pair of elongated pivoted jaws manipulatable to open and closed positions and being of a transverse shape, to define, when in said closed position, an open end trough extending lengthwise between said jaws for receiving and retaining a temple bar lengthwise between said jaws, one of said jaws having an arcuate end for engaging the the temple bar retained between said jaws and worked over said end.

6. In a tool of the class described, a pair of elongated jaws connected together and manipulatable to open and closed positions, said jaws being of a cross-sectional shape to define, when in said closed position, an elongated open end trough extending lengthwise between said jaws for receiving and retaining a temple bar inserted in said trough, an anvil disposed at one end of said trough for engaging and shaping the temple bar retained in said trough and worked over said anvil.

JOHN E. COLLINS.

REFERENCES CITED

The following references are of record in the file of this patent:

UNITED STATES PATENTS

| Number | Name | Date |
| --- | --- | --- |
| 292,643 | Friend | Jan. 29, 1884 |
| 768,161 | Thompson | Aug. 23, 1904 |

FOREIGN PATENTS

| Number | Country | Date |
| --- | --- | --- |
| 138 | Great Britain | of 1878 |
| 250,557 | Germany | Nov. 30, 1911 |
| 424,279 | Germany | Jan. 22, 1926 |